(12) United States Patent
McCunn et al.

(10) Patent No.: US 11,994,971 B2
(45) Date of Patent: May 28, 2024

(54) SYSTEM AND METHOD FOR OPTIMIZING PERFORMANCE OF ONLINE SERVICES

(71) Applicant: Shopify Inc., Ottawa (CA)

(72) Inventors: Morgan McCunn, Toronto (CA);
Ershad Rahimikia, Toronto (CA);
Javier Arturo Moreno, Toronto (CA)

(73) Assignee: Shopify Inc., Ottawa (CA)

( * ) Notice: Subject to any disclaimer, the term of this patent is extended or adjusted under 35 U.S.C. 154(b) by 564 days.

(21) Appl. No.: 17/186,040

(22) Filed: Feb. 26, 2021

(65) Prior Publication Data
US 2022/0276948 A1 Sep. 1, 2022

(51) Int. Cl.
| G06F 11/34 | (2006.01) |
| G06F 8/38 | (2018.01) |
| G06F 8/71 | (2018.01) |
| G06F 8/77 | (2018.01) |
| G06F 9/445 | (2018.01) |
| G06Q 30/0601 | (2023.01) |

(52) U.S. Cl.
CPC ............ *G06F 11/3466* (2013.01); *G06F 8/38* (2013.01); *G06F 8/71* (2013.01); *G06F 8/77* (2013.01); *G06F 9/44526* (2013.01); *G06Q 30/0641* (2013.01)

(58) Field of Classification Search
CPC .......... G06F 11/3466; G06F 8/38; G06F 8/71; G06F 8/77; G06F 9/44526; G06F 8/61; G06F 8/65; G06F 11/3006; G06F 11/3452; G06F 2201/81; G06F 2201/86; G06F 11/3419; G06Q 30/0641; G06Q 30/0601
See application file for complete search history.

(56) References Cited

U.S. PATENT DOCUMENTS

| 2014/0059199 A1* | 2/2014 | Do .......................... G06F 11/26 709/224 |
| 2017/0154366 A1* | 6/2017 | Turgeman ............. G06F 21/316 |

* cited by examiner

*Primary Examiner* — Tung S Lau
(74) *Attorney, Agent, or Firm* — Rowand LLP

(57) ABSTRACT

A computer-implemented method is disclosed. The method includes: obtaining, by a server, a value for at least one performance metric associated with a first online service; detecting a service modification event for the first online service; identifying, by the server, a second online service; obtaining historical service modification events data for the second online service; comparing changes in the value for the at least one performance metric resulting from the service modification event for the first online service to changes in performance metric values resulting from historical service modification events for the second online service; determining that the service modification event is associated with an unanticipated performance change for the first online service based on the comparing; and providing an indication identifying the service modification event as being associated with the unanticipated performance change for the first online service.

20 Claims, 9 Drawing Sheets

FIG. 3

SYSTEM AND METHOD FOR OPTIMIZING PERFORMANCE OF ONLINE SERVICES

FIELD

The present disclosure relates to computer-implemented online services and, in particular, to methods for tracking and optimizing performance of online services that are provided on a centralized service hosting platform.

BACKGROUND

Online services, such as e-commerce websites, may be continuously modified to provide optimal end user experience. For example, a merchant may augment their e-commerce website by installing applications (e.g., plug-ins) and/or themes that are designed to provide functionalities which may be desirable for customers that visit the website.

BRIEF DESCRIPTION OF THE DRAWINGS

Embodiments will be described, by way of example only, with reference to the accompanying figures wherein:

FIG. 3 is an example of a home page of an administrator, in accordance with an example embodiment;

DETAILED DESCRIPTION

Figure 1:
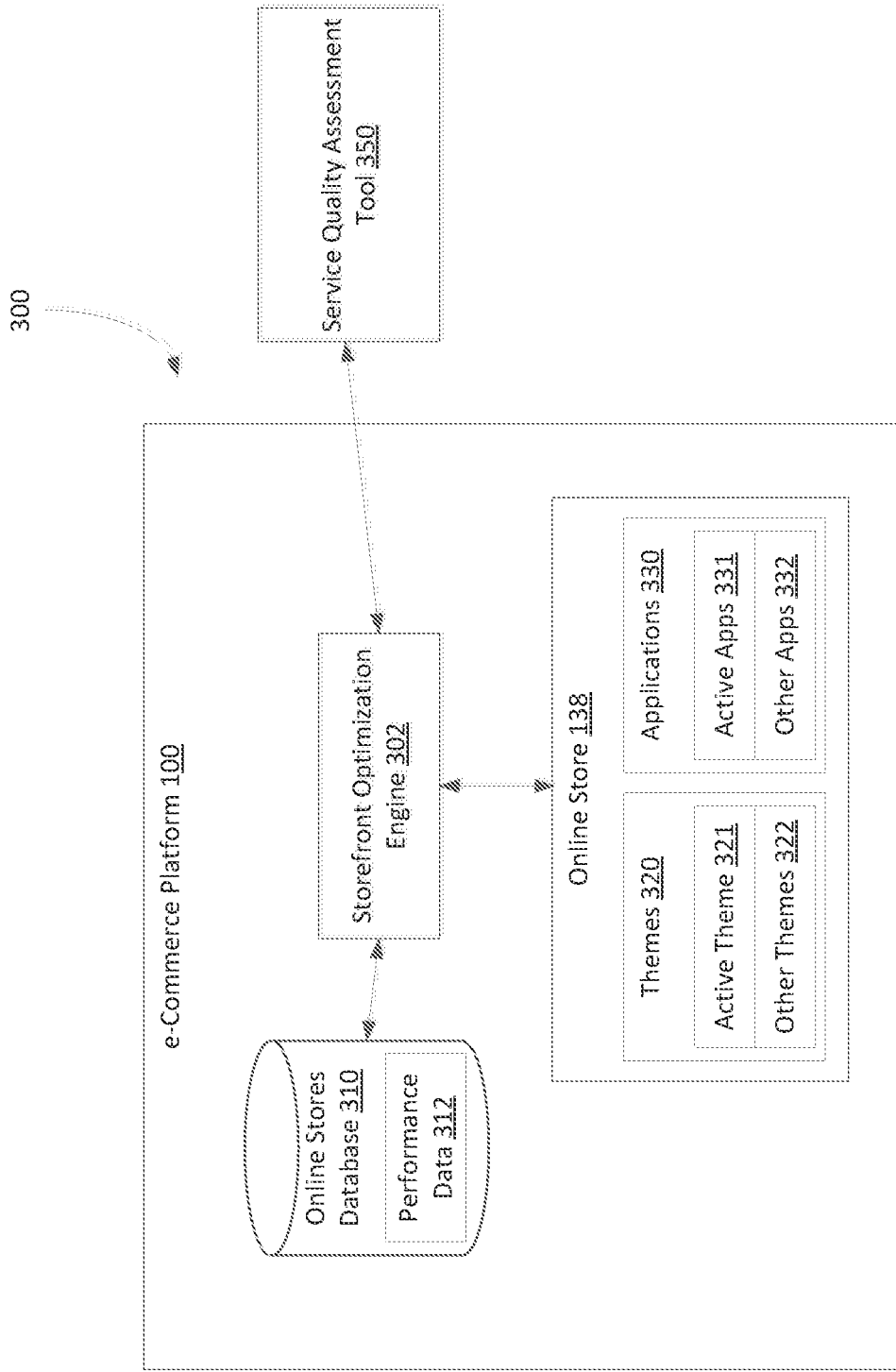
FIG. 1 illustrates an example system for optimizing performance of online stores.

In one aspect, the present application discloses a computer-implemented method. The method includes: obtaining, by a server, a value for at least one performance metric associated with a first online service; detecting a service modification event for the first online service; identifying, by the server, a second online service; obtaining historical service modification events data for the second online service; comparing changes in the value for the at least one performance metric resulting from the service modification event for the first online service to changes in performance metric values resulting from historical service modification events for the second online service; determining that the service modification event is associated with an unanticipated performance change for the first online service based on the comparing; and providing an indication identifying the service modification event as being associated with the unanticipated performance change for the first online service.

The disclosed method provides an effective, lightweight solution for monitoring performance of online services.

In some implementations, the service modification event may be one of: installation of a plugin for the first online service; updating to a new version of a plugin that is installed for the first online service; changing a current theme associated with the first online service; changes in configuration associated with the first online service; or modifying source code for a current theme.

In some implementations, identifying the second online service may include: computing a similarity score for the second online service, the similarity score indicating similarity of the second online service to the first online service; and determining that the similarity score for the second online service exceeds a defined threshold.

In some implementations, the similarity score for the second online service may be computed based on comparing service data associated with the first and second online services.

In some implementations, the method may further include: identifying one or more third online services that are different from the second online service; obtaining historical service modification events data for the one or more third online services; comparing changes in the value for the at least one performance metric resulting from the service modification event for the first online service to changes in performance metric values resulting from historical service modification events for the one or more third online services, and the service modification event may be determined to be associated with the unanticipated performance change for the first online service based on the comparisons using data for the second online service and the one or more third online services.

In some implementations, identifying the second online service may include identifying a service that is similar to the first online service based on a first similarity criterion and identifying the one or more third online services may include identifying services that are similar to the first online service based on criteria different from the first similarity criterion.

In some implementations, determining that the service modification event is associated with the unanticipated performance change for the first online service may include determining that a difference between an amount of change in the value for the at least one performance metric resulting from the service modification event for the first online service and an amount of change in value for the same at least one performance metric resulting from the service modification event for the second online service exceeds a defined threshold.

In some implementations, determining that the service modification event is associated with the unanticipated performance change for the first online service may include determining that an amount of change in the value for the at least one performance metric exceeds a defined threshold.

In some implementations, determining that the service modification event is associated with the unanticipated performance change for the first online service may include determining that the service modification event occurred for the first online service either within a defined time window prior to detecting the performance change or since a last measurement of the value for the at least one performance metric.

In some implementations, the method may further include determining one or more recommended corrective actions for the first online service, and providing the indication may include communicating the one or more recommended corrective actions to a computing system associated with the first online service.

In some implementations, the method may further include automatically executing one or more corrective actions for undoing the service modification event for the first online service.

In some implementations, executing the one or more corrective actions comprises at least one of: uninstalling a plugin for the first online service; or reverting to a previous theme associated with the first online service.

In some implementations, the one or more corrective actions may be ranked according to likelihood of impact on performance for the first online service and the one or more corrective actions may be sequentially executed based on their respective ranks.

In some implementations, the method may further include identifying, based on the comparing, at least one service setting for the first online service that, in combination with the service modification event, is associated with the unanticipated performance change for the first online service, and the indication may identify the service modification event and the at least one service setting as being associated with the unanticipated performance change for the first online service.

In some implementations, the method may further include: detecting at least one additional service modification event for the first online service; determining a ranking of the service modification events for the first online service according to likelihood of causing the performance change, and comparison of changes in performance metric values resulting from the service modification events for the first online service may be performed according to an order based on the ranking of the service modification events.

In another aspect, the present application discloses a computing system. The computing system includes a processor and a memory storing computer-executable instructions that, when executed, are to cause the processor to: obtain a value for at least one performance metric associated with a first online service managed; detect a service modification event for the first online service; identify a second online service; obtain historical service modification events data for the second online service; compare changes in the value for the at least one performance metric resulting from the service modification event for the first online service to changes in performance metric values resulting from historical service modification events for the second online service; determine that the service modification event is associated with an unanticipated performance change for the first online service based on the comparing; and provide an indication identifying the service modification event as being associated with the unanticipated performance change for the first online service.

In another aspect, the present application discloses a non-transitory, computer-readable medium storing computer-executable instructions that, when executed by a processor, are to cause the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . ." is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "online service" is intended to encompass various different types of services which may be provided to end users over a network of computers. An online service may refer to, without limitation, a website, a web application, one or more component-based applications, software (e.g., on-demand software, cloud-based software, etc.), a social media network, or an e-commerce platform.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

Optimizing Performance of Online Services

Online services are often provided on a centralized service hosting platform. By way of example, merchant online stores may be served through websites provided by a server of an e-commerce platform. More generally, web content, including blogs, membership sites, forums, mailing lists, and the like, may be provided on a content management platform, such as WordPress™. A service hosting platform may support various different types of clients (e.g., merchants). The functionalities of online services that are offered on a service hosting platform may be extensible to enable greater flexibility and customization processes for clients. In particular, various service modification actions for modifying (e.g., extending, upgrading, etc.) a base set of features and functionalities may be available for online services. For example, a client, such as an operator of an online service, can customize their website(s) on a service hosting platform by, for example, installing software (e.g., plug-ins), updating to new versions of software, applying or changing themes, or editing source code for an existing theme.

Service modification events can impact the performance of an online service. While a greater degree of flexibility and customization may be welcome, the cost in terms of the effect of service modifications on performance and end-user experience is often the prevailing factor for clients in their design decisions. Identifying the causes of performance changes (e.g., a decrease in performance) for an online service may be challenging, especially if multiple changes to the online service are completed in succession. Basic performance analysis reports, such as daily performance statistics, would not indicate which specific modification activity, or combination of activities, resulted in a detected performance change for an online service.

One approach for tracking service modification activity is to constantly monitor performance of a service, such that performance before and after particular modification events can be easily ascertained. However, this approach may not be practical in many scenarios, as continuous performance monitoring can require extensive computing resources: processing resources on the client-side or server-side (or both) to gather the required performance data, as well as storage resources to record the data for subsequent analysis.

Another approach is testing to isolate performance differences resulting from individual service changes. In particular, performance tests may be run after a performance change (e.g., a decrease in performance) is detected. This approach generally requires the ability to run performance tests on previous versions, or instances, of the online service. Any tests to isolate the changes from a given modification event (by using multiple versions of the online service at different points in time) would require the ability to "roll back" to a complete copy of the online service data at a previous point in time. This is a complex process that can be expensive in terms of storage and/or processing resources: storage-intensive if storing full previous versions of the online service data for subsequent access and analysis, and processing-intensive if rolling back and/or replaying changes to recreate a full previous version of the online service data on-the-fly.

Therefore, it is desired to provide an effective, lightweight solution for monitoring performance of online services.

In one aspect, the present application describes techniques for optimizing performance of online services. More specifically, methods for tracking and optimizing the performance of services that are provided on a centralized service hosting platform, such as an e-commerce platform, are disclosed. In accordance with example embodiments, cross-services data for online services that are provided on a service hosting platform is leveraged to inform the performance optimization decisions for individual services. Upon detecting a service modification event for a first online service, a server associated with the service hosting platform identifies those of its hosted services that are "similar" to the first online service. The server obtains historical service modification events data for the identified similar services and compares the relative performance impact of the service modification event on the first online service and the identified similar services. If the performance impacts are similar, the performance change resulting from the service modification event may be determined to be an "expected" or anticipated change and no further action may be taken. If, on the other hand, the performance impacts are not similar, the service modification event may be flagged as requiring corrective action. For example, if the service modification event has a disproportionately larger performance impact for the first online service, the server may generate recommendations of, or automatically execute, one or more corrective actions in connection with the service modification event.

The "similar" services, which serve as references for the purpose of comparing the relative performance impacts of the service modification event, may be identified based on a number of factors, or similarity criterion, such as industry, geographical region of service users and/or operators, installed software (e.g., plug-ins), applied themes, web traffic, and the like. In at least some embodiments, the server associated with the service hosting platform may identify multiple sets of services that are similar to the first online service corresponding to different similarity criteria, and the relative performance impacts of a service modification event may be assessed for all or a plurality of the sets of similar services.

The proposed solution allows for efficient detection of performance changes for an online service and identification of possible (or likely) causes of the performance changes. The solution relies on using cross-service data (specifically, historical service modification data for one or more similar services) to ascertain the relative performance impacts of a service modification event on the online service and similar services, and determining whether the service modification event is a possible cause of an unanticipated adverse performance change for the online service. The identified cause(s) may be investigated further (for example, by notifying a client associated with the online service) or corrective actions may be automatically executed to rectify the adverse performance effects on the online service.

In accordance with example embodiments of the present disclosure, service performance data may be gathered using real-world data (e.g., based on actual website visits by end-users) or through a controlled testing environment. For the testing environment, the environment variables, such as network parameters, simulated traffic volume, clicks, webpage views, and other service activity metrics, may be controllable and can be kept constant across test runs. A copy of the online service (e.g., website) data can be loaded into the testing environment and service performance in response to service modification events can be monitored and recorded.

Reference is made to FIG. 1 which illustrates, in block diagram form, an example system 300 for tracking and optimizing performance of online services. FIG. 1 shows example components for service optimization in the specific context of online stores that are served through websites provided by an e-commerce platform; it will be understood that other system configurations may be possible for optimizing performance of other types of online services. The system 300 includes an e-commerce platform 100, a storefront optimization engine 302, an online stores database 310 (including performance data 312), and a plurality of online stores 138. Each online store 138 includes themes 320, which may include at least one active theme 321 that is currently applied to the online store 138 and one or more other (e.g., available, inactive, etc.) themes 322, and applications 330, which may include active applications 331 and one or more other applications 332.

The online stores database 310 contains data pertaining to the online stores 138 provided on the e-commerce platform 100. For example, the online stores database 310 may contain store identifying information, merchant account information, products data, active and/or available applications and theme information, web traffic statistics, and the like. In some embodiments, performance data 312, which may include historical performance data, for the online stores 138 may be stored in the online stores database 310. For example, the online stores database 310 may store historical values for one or more web performance metrics for the online stores 138.

The storefront optimization engine 302 executes processes for detecting performance changes and determining possible causes of the performance changes in connection with the online stores 138. In at least some embodiments, the storefront optimization engine 302 is configured to detect service modification events and obtain web performance data (e.g., performance metric values) for the online stores 138. When a service modification event (e.g., install of a plug-in, change of a current theme, etc.) occurs for an online store 138, the storefront optimization engine 302 may be notified of the event and monitor performance data for the online store 138. In particular, the storefront optimization engine 302 may obtain web performance metric values for the online store 138 following the service modification event. The storefront optimization engine 302 also has access to historical service modification events data for other online stores 138 that are provided on the e-commerce platform 100. As will be explained in greater detail below, the storefront optimization engine 302 uses cross-service data (in particular, service modification events data for a plurality of hosted services) to detect a performance change for a service and to identify possible cause(s) for the detected change.

The system 300 also includes a service quality assessment tool 350. In at least some embodiments, the service quality assessment tool 350 may be provided by a third-party that is external to the e-commerce platform. For example, the service quality assessment tool 350 may be an automated audit tool (e.g., Google Lighthouse™) for measuring performance, quality, and correctness of web pages. The storefront optimization engine 302 may be configured to communicate directly with the service quality assessment tool 350 to obtain performance data associated with the online stores 138 that are provided on the e-commerce platform 100.

Figure 4:
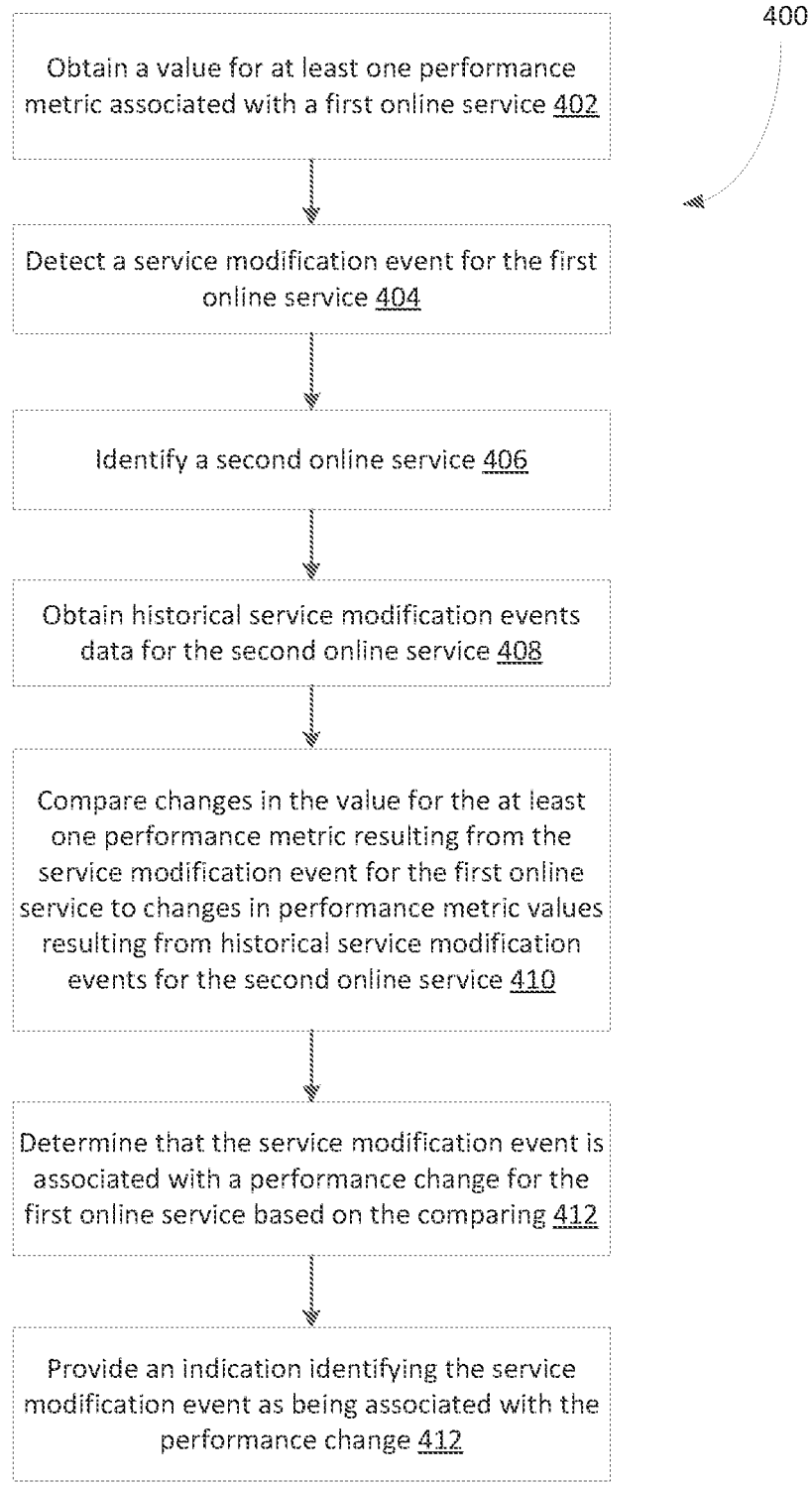
FIG. 4 shows, in flowchart form, an example method for optimizing performance of an online service.

Reference is made to FIG. 4 which shows, in flowchart form, an example method 400 for optimizing performance of an online service. The method 400 may be implemented by a computing system, such as a server computer. More specifically, a server associated with a service hosting platform, such as the e-commerce platform 100 of FIG. 1, may be configured to perform the operations of method 400 for monitoring and optimizing the performance of one or more hosted online services.

In operation 402, the server obtains a value for at least one performance metric associated with a first online service. That is, the server obtains one or more performance metric values indicating performance of the first online service. In at least some embodiments, the performance metric(s) may measure user-centric performance of the first online service. For example, the performance metric(s) may be one or more of: first contentful paint (FCP), largest contentful paint (LCP), first input delay (FID), time to interactive (TTI), total blocking time (TBT), and cumulative layout shift (CLS). FCP measures the time from when a web page starts loading to when any part of the page's content is rendered on-screen. LCP measures the time from when a web page starts loading to when the largest text block or image element is rendered on-screen. FID measures the time from when a user first interacts with a website (e.g., selecting a link, using a custom, Javascript-powered control, etc.) to the time when a browser is able to respond to that interaction. TTI measures the time from when a web page starts loading to when it is visually rendered, its initial scripts have loaded, and it is capable of reliably responding to user input. TBT measures the total amount of time between FCP and TTI where a main thread was blocked for long enough to prevent input responsiveness. CLS measures the cumulative score of all unexpected layout shifts that occur between when the page starts loading and when its lifecycle state changes to hidden. Values of other standardized metrics (for example, relating to runtime responsiveness and smoothness) and custom-defined metrics may additionally, or alternatively, be obtained by the server, in operation 402. In some embodiments, the server may compute a representative performance score based on a plurality of performance metric values. For example, the server may obtain values for a plurality of different performance metrics, and compute an average (e.g., a weighted average) of the performance metric values to derive a cumulative performance score. As another example, the server may obtain performance metric values for one or more select web pages (and more generally, service instances) of the first online service and compute a representative score based on the performance metric values for the select web pages.

In some embodiments, other metrics associated with the first online service may be used as indirect indicators of performance; such metrics may include render blocking time, number of un-minified scripts, total byte weight of scripts, liquid rendering time, number of theme updates, and the like.

The performance metric values for the first online service may be obtained periodically (e.g., at regular time intervals) or at defined time periods. The server may store the performance metric values in association with the first online service, for example, in a database (such as online stores database 310) that stores service-related data for one or more services hosted by the service hosting platform.

In operation 404, the server detects a service modification event for the first online service. A service modification event may be an event that changes (e.g., adds, updates, removes, etc.) the functionalities that are offered by the first online service. The service modification event may be, for example, install of new software (e.g., plugin), updating to a new version of installed software, changing a currently applied theme, changes in configuration associated with the first online service (e.g., addition of products or variants), or modifying the source code for a current theme. In at least some embodiments, the server may receive notification from the first online service including information relating to the service modification event (e.g., type of modification, date/time of event, identifying information for the application/theme, etc.).

In operation 406, the server identifies a second online service. The second online service is a service that is hosted on the same service hosting platform as the first online service and is used as a reference for comparing the relative performance impact of the service modification event. In at least some embodiments, the second online service is a service that is "similar" to the first online service, based on various defined similarity criteria. That is, the server identifies a service that is similar to the first online service in one or more aspects and compares the relative impact that the service modification event had on the performance of the services. By performing the comparison, the server may determine whether the performance change detected for the first online service is one that is "expected" (or standard/anticipated/normal) for the service modification event. In particular, if the performance impact was similar for the first and second online services, the server may determine that the performance change is an "expected" change.

Figure 5:
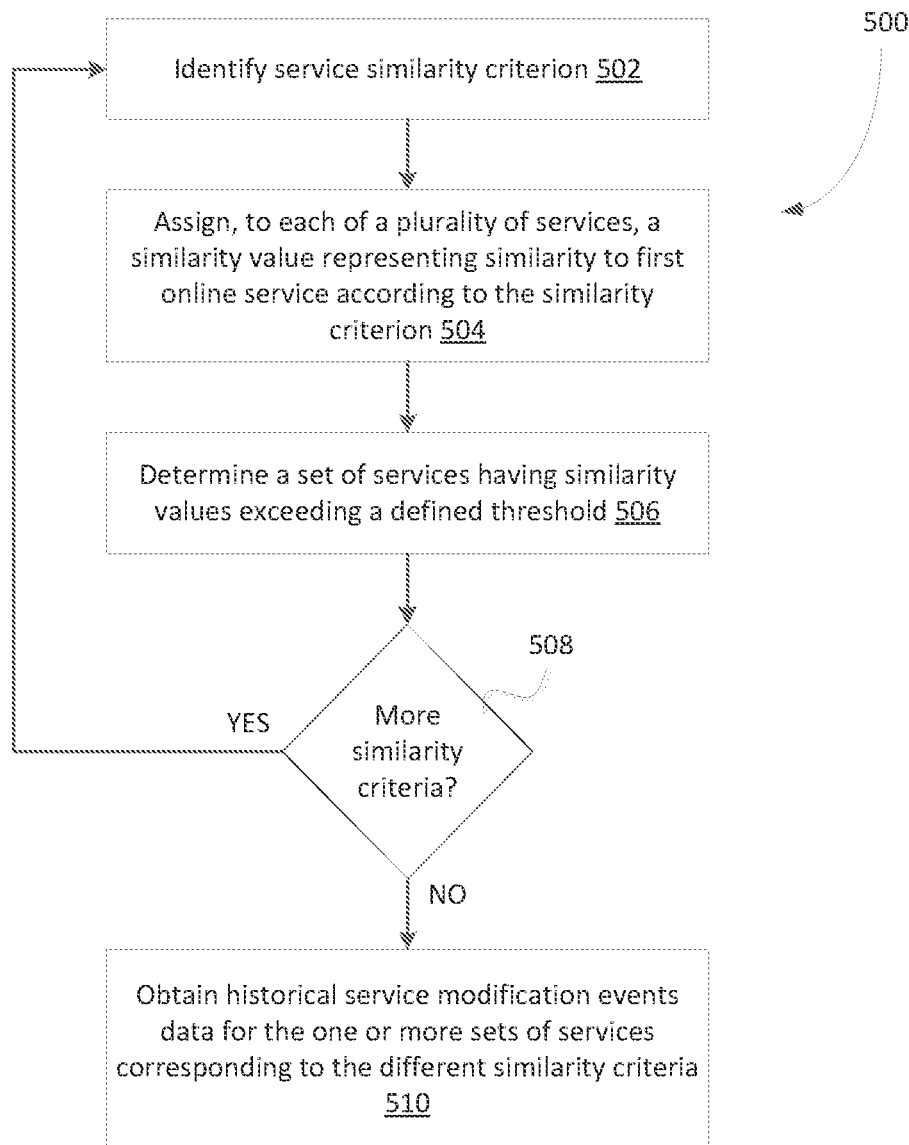
FIG. 5 shows, in flowchart form, an example method for identifying services that are similar to a first online service.

FIG. 5 shows, in flowchart form, an example method 500 for identifying services that are similar to a first online service. The operations of method 500 may be performed as part of a process for optimizing performance of an online service. For example, the operations of method 500 may be implemented for identifying the second online service (e.g., as part of operation 406) in method 400.

In operation 502, the server identifies a service similarity criterion. A service similarity criterion refers to a criterion by which similarity between two or more services may be assessed. In some embodiments, a service similarity criterion may relate to service configuration data, such as installed applications/plugins, active theme(s), service plan, and the like. In some embodiments, a service similarity criterion may relate to service content and analytics, such as industry of the service, web traffic, types of service users (e.g., website visitors) and their browsing behavior, sales volumes, and the like.

In operation 504, the server assigns, to each of a plurality of online services, a similarity value representing similarity to the first online service according to the service similarity criterion. The online services are services that are hosted by the same service hosting platform as for the first online service. The similarity value may, for example, be a numerical value on a standardized scale, and the similarity value may correspond to the degree of similarity to the first online service. In particular, a higher similarity value may correspond to greater similarity to the first online service according to the service similarity criterion.

In operation 506, the server determines a set of the online services that have similarity values which exceed a defined threshold. That is, the server identifies those online services which are "sufficiently" similar to the first online service, based on the similarity values in accordance with the service similarity criterion.

In operation 508, the server checks to determine whether there are more service similarity criteria for assessing the online services associated with the service hosting platform. For example, the server may be configured to evaluate the online services based on a defined set of service similarity criteria. The server may iterate through this set of service similarity criteria to assign similarity values to the online services and identify sets of sufficiently similar services according to the different service similarity criteria.

In operation 510, the server obtains historical service modification events data for the one or more sets of online services corresponding to the different similarity criteria. In particular, the server obtains, for the similar online services that are included in the identified sets, lists of past service modification events and performance change data (e.g., changes in performance metric values) associated with the service modification events.

Figure 6:
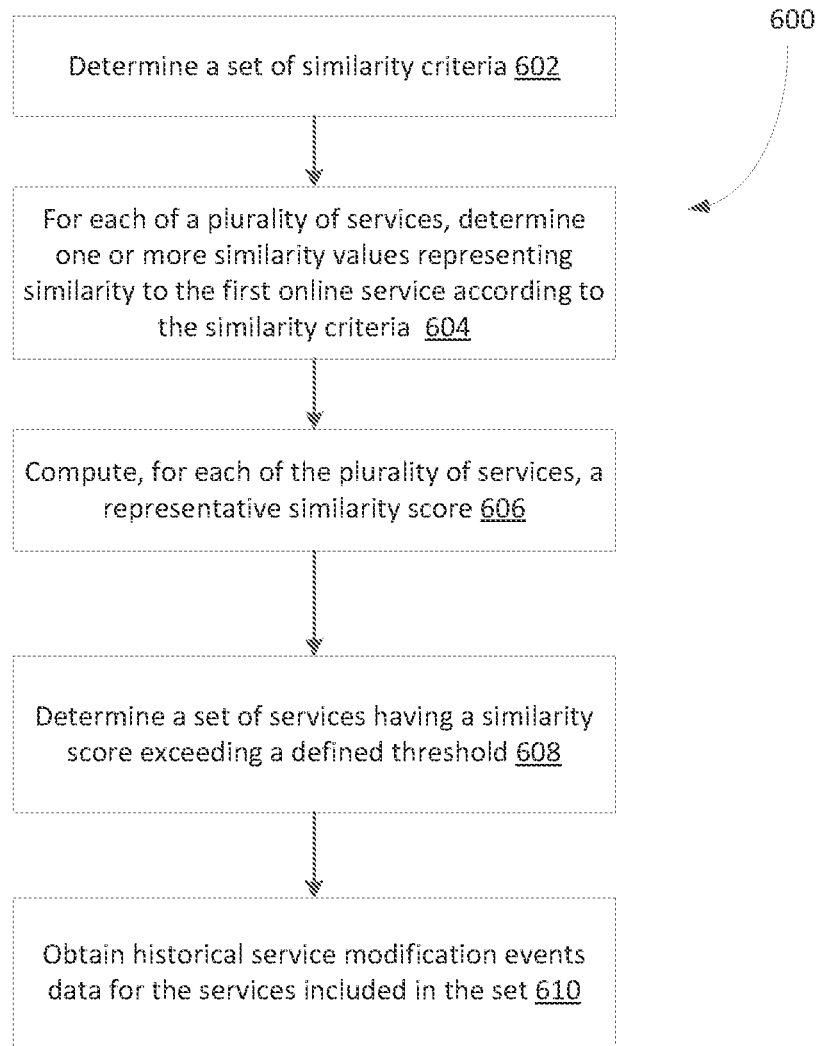
FIG. 6 shows, in flowchart form, another example method for identifying services that are similar to a first online service.

FIG. 6 shows, in flowchart form, another example method 600 for identifying services that are similar to a first online service. The operations of method 600 may be performed as part of a process for optimizing performance of an online service. For example, the operations of method 600 may be implemented for identifying the second online service (e.g., as part of operation 406) in method 400. The methods 500 and 600 may be performed in combination, or as alternatives, when identifying similar services for comparing the performance impact of service modification events.

In operation 602, the server determines a set of service similarity criteria. As described above, the service similarity criteria may relate to service configuration data, such as installed applications/plugins, active theme(s), service plan, and/or service content and analytics, such as industry of the service, web traffic, types of service users (e.g., website visitors) and their browsing behavior, sales volumes, and the like.

In operation 604, for each of a plurality of online services, the server assigns one or more similarity values representing similarity to the first online service according to the similarity criteria. That is, for each online service hosted by the service hosting platform, the server determines similarity values, which represent similarity to the first online service, for each criterion of the set of service similarity criteria. In operation 606, the server computes, for each of the plurality of online services, a representative similarity score. The similarity "score" may, for example, be a computed average (e.g., weighted average) based on all or a subset of the similarity values that are assigned to a service.

In operation 608, the server determines a set of online services that have a similarity score which exceed a defined threshold. The similarity score for a service is taken as a proxy for an overall similarity (or closeness) of the service to the first online service, and the server identifies those services having scores exceeding a threshold as being "sufficiently similar" to the first online service. In operation 610, the server obtains historical service modification events data for the services included in the set. In particular, the server obtains, for the similar online services that are included in the identified sets, lists of past service modification events and performance change data (e.g., changes in performance metric values) associated with the service modification events.

Returning to FIG. 4, in operation 408, the server obtains historical service modification events data for the second online service. More specifically, the server ascertains one or more past service modification events for the second online service and obtains data indicating performance impact of the service modification events. The historical service modification events data may include, for example, performance metrics data for the second online service and changes thereto that correspond to past service modification events for the second online service. For example, the historical service modification events data may indicate performance changes (e.g., changes in performance metric values) resulting from one or more past service modification events. The performance data for the second online service that is obtained in operation 408 may include values for the same performance metrics whose values are obtained for the first online service in operation 402. In particular, the server may obtain values for the same set of performance metrics for the first and second online services.

In operation 410, the server compares changes in the value for the at least one performance metric resulting from the service modification event for the first online service to changes in performance metric values resulting from historical service modification events for the second online service. The server determines changes in the performance metrics for the first online service, by obtaining value(s) for the at least one performance metric subsequent to the detection of the service modification event. The changes may, for example, be determined as absolute change or relative (e.g., percentage) change in the value(s). The server then compares the performance metric value changes for the first online service to the changes in performance metric values resulting from a past occurrence of the same service modification event for the second online service. In particular, the server identifies changes in performance metric values resulting from the service modification event based on the historical service modification events data for the second online service. The server may, for example, compare changes in values for the same set of performance metrics for the first and second online services in operation 410.

In operation 412, the server determines that the service modification event is associated with an unanticipated performance change for the first online service based on comparing the relative performance impact for the first and second online services. More specifically, the server identifies the service modification event as a possible (or likely) cause of an unanticipated (e.g., adverse) change in performance for the first online service, if the performance impact is not similar for the first and second online services. In some embodiments, the service modification event may be determined to be associated with an unanticipated performance change if the server determines that a difference between an amount of change in the value for the at least one performance metric resulting from the service modification event for the first online service and an amount of change in value for the same at least one performance metric resulting from the same service modification event for the second online service exceeds a defined threshold (e.g., threshold difference in absolute or relative change in performance metric value(s)).

In some embodiments, the service modification event may only be determined to be associated with an unanticipated performance change if the service modification event is determined to have occurred within a defined time window prior to detecting the performance change or since a last measurement of the value for the at least one performance metric. That is, the service modification event may be considered as a possible or likely cause of the unanticipated performance change if it satisfies certain defined temporal conditions in relation to detection of the performance change.

In some embodiments, the service modification event may be determined to be associated with the unanticipated performance change if the server determines that an amount of change in the value for the at least one performance metric exceeds a defined threshold. In particular, the service modification event may be considered as a possible or likely cause of the unanticipated performance change if it satisfies certain conditions in relation to the actual amount (e.g., absolute or relative amount) of change in performance metric value(s) resulting from the service modification event.

In operation 414, the e-commerce platform provides an indication identifying the service modification event as being associated with an unanticipated performance change. In some embodiments, the server may further identify, based on the comparing, at least one service setting (e.g., currently installed applications, themes, etc.) for the first online service that, in combination with the service modification event, is associated with the unanticipated performance change for the first online service. That is, the indication may flag potential synergistic effects of the service modification event and one or more service settings that are possibly (or likely) causing the unanticipated performance change.

Figure 7:
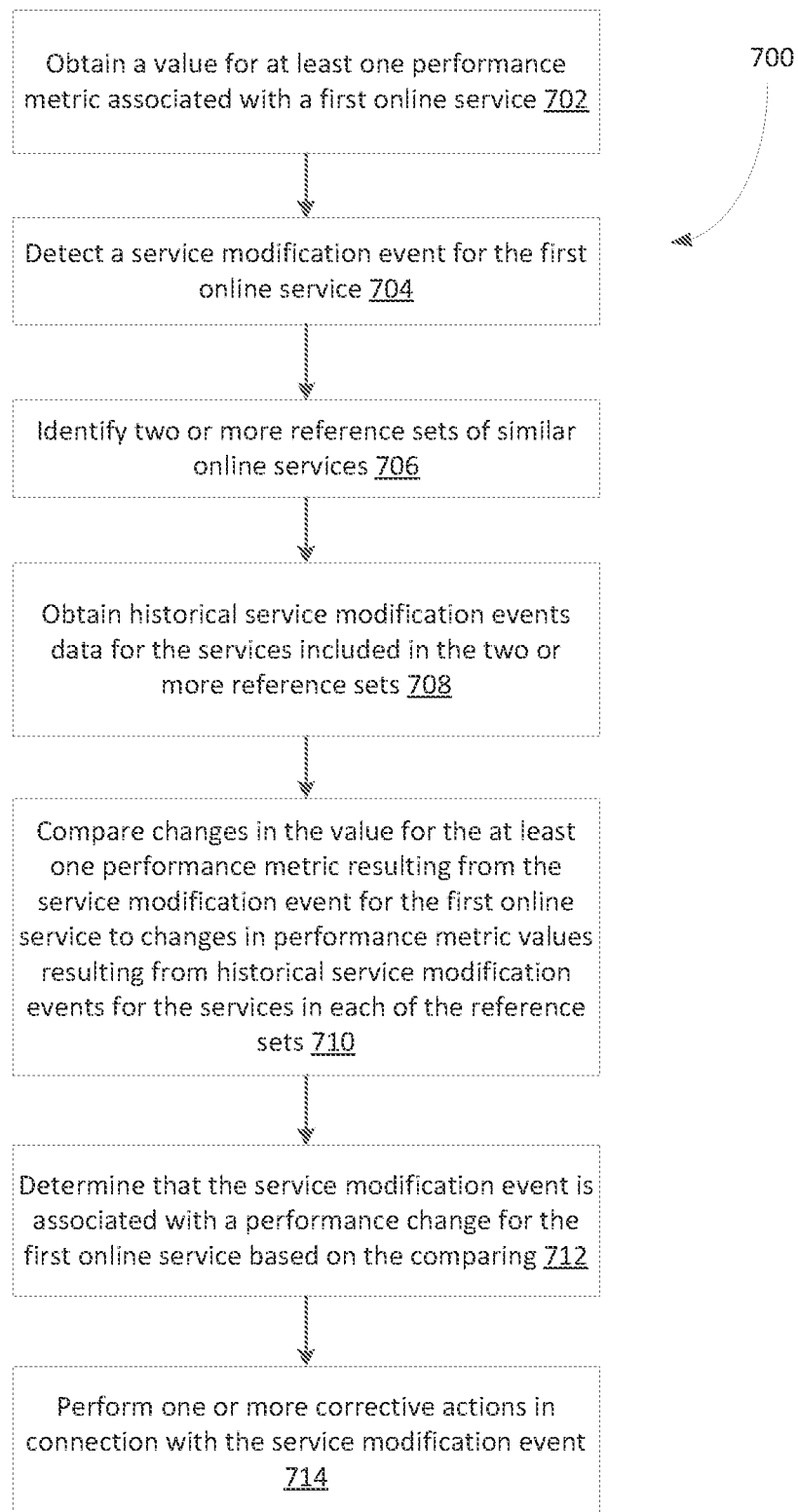
FIG. 7 shows, in flowchart form, another example method for optimizing performance of an online service.

Reference is now made to FIG. 7 which shows, in flowchart form, another example method 700 for optimizing performance of an online service. The method 700 may be implemented by a computing system, such as a server associated with a service hosting platform that hosts the online service. The operations of method 700 may be performed in addition to, or as alternatives of, one or more operations of method 400.

In operation 702, the server obtains a value for at least one performance metric associated with a first online service. In operation 704, the server detects a service modification event for the first online service. The service modification event may, for example, be install of new software (e.g., plugin), updating to a new version of installed software, changing a currently applied theme, or modifying the source code for a current theme.

In operation 706, the server identifies two or more reference sets of similar online services. That is, unlike in method 400, multiple reference sets are used for comparing the relative performance impact of the detected service modification event. In particular, at a minimum, the server may identify a second online service and one or more third online services that are different from the second online service. The reference sets may correspond to different service similarity criteria. More specifically, the reference sets may be defined such that each reference set includes those services (hosted by the same service hosting platform) that are similar to the first online service according to a respective service similarity criterion. For example, the server may identify a first reference set including those services that are similar to the first online service according to a first service similarity criterion, and a second reference set including those services that are similar to the first online service according to a second, different service similarity criterion. In this way, the server can evaluate performance impact of the service modification event across services that are identified as being similar to the first online service along multiple different "axes" or criteria (for example, multiple similarity criteria). By comparing against the performance impact for different types of similar services, the server may better hone in on the probable cause(s) of any unanticipated performance changes for the first online service.

In operation 708, the server obtains historical service modification events data for the services included in the two or more reference sets, and in operation 710, the server compares changes in the value for the at least one performance metric resulting from the service modification event for the first online service to changes in performance metric values resulting from historical service modification events for the services in each of the reference sets.

In operation 712, the server determines that the service modification event is associated with an unanticipated performance change for the first online service based on comparing the relative performance impact of the service modification event on the services of the multiple reference sets. In operation 714, the server performs one or more corrective actions in connection with the service modification event. For example, the server may identify one or more corrective actions for undoing the service modification event, and automatically execute the identified corrective actions.

Figure 8:
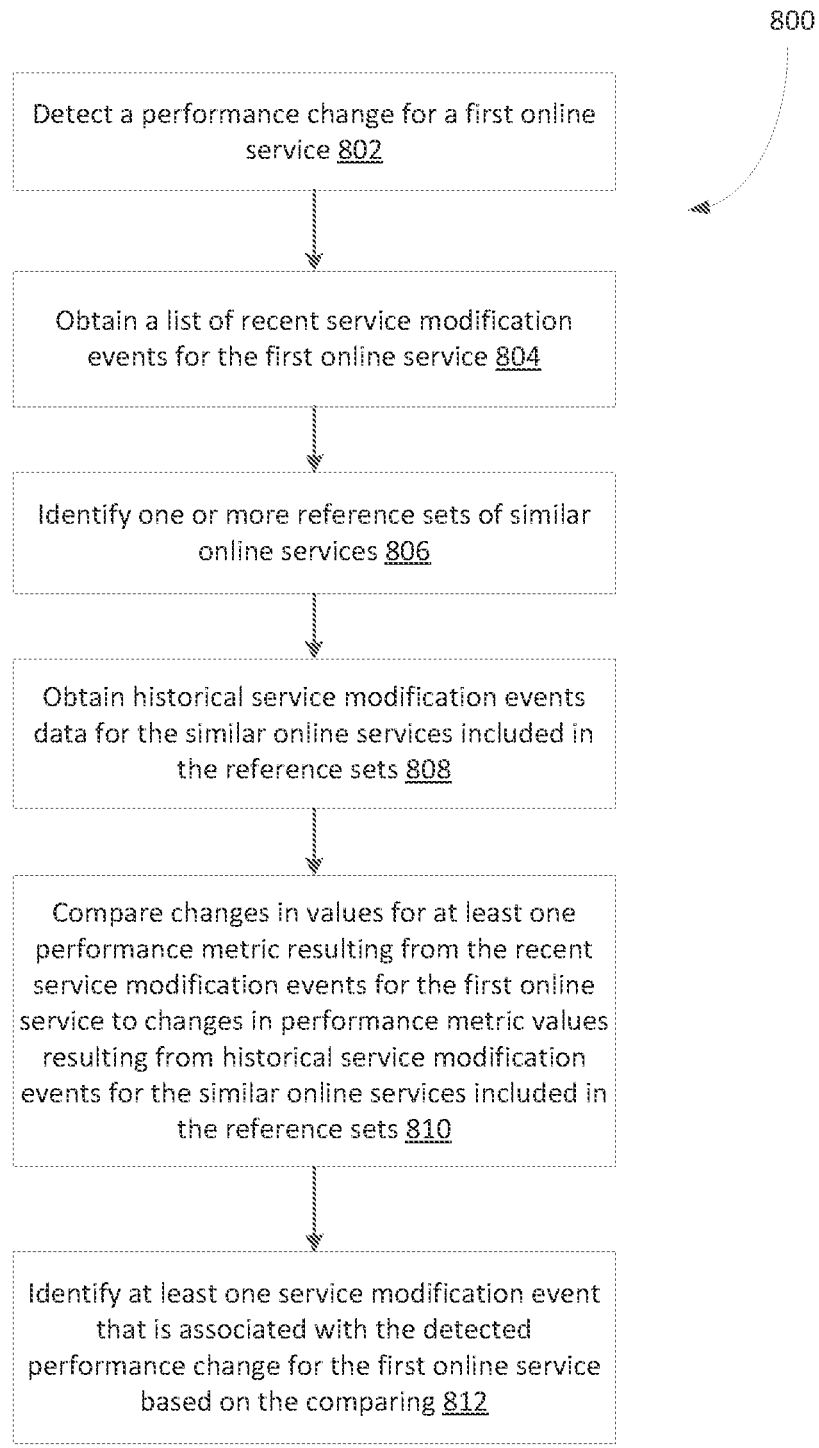
FIG. 8 shows, in flowchart form, another example method for optimizing performance of an online service.

Reference is now made to FIG. 8 which shows, in flowchart form, another example method 800 for optimizing performance of an online service. The method 800 may be implemented by a computing system, such as a server associated with a service hosting platform. The operations of method 800 may be performed in addition to, or as alternatives of, one or more operations of methods 600 and 700.

In operation 802, the server detects a performance change for a first online service. The server may, for example, detect, based on monitoring performance metric values for the first online service, performance degradation for the first online service. For example, the server may monitor performance of the first online service periodically and determine when there is a decrease in one or more monitored performance metric values.

In response to detecting the performance change, the server obtains a list of past service modification events for the first online service, in operation 804. For example, the server ascertains a set of one or more recent service modification events that have occurred in connection with the first online service.

In operation 806, the server identifies one or more reference sets of services that are similar to the first online service. In at least some embodiments, the server defines multiple reference sets corresponding to different service similarity criteria, and assigns services to the reference sets. The reference sets may thus include those services (hosted by the same hosting service platform as for the first online service) that are similar to the first online service according to different similarity criteria.

In operation 808, the server obtains historical service modification events data for the services that are included in the reference sets, and in operation 810, the server compares changes in values for at least one performance metric resulting from the recent service modification events for the first online service to changes in performance metric values resulting from historical service modification events for the similar online services included in the reference sets.

In operation 812, the server identifies at least one service modification event that is associated with the detected performance change for the first online service based on the comparing. In some embodiments, there may be multiple service modification events that are identified as being possible or likely causes of the detected performance change for the first online service. If multiple possible causes are detected, the server may determine a ranking of such service modification events for the first online service. For example, the server may rank the service modification events according to a likelihood of causing the detected performance change. In some embodiments, the server may obtain a set of service modification events that were previously flagged or known to cause performance changes. The server may retrieve this information and define a ranking of the service modification events based on the information. If a ranking of the service modification events is defined, the server may evaluate the service modification events according to an order corresponding to the ranking; in particular, the server may perform comparison of the relative performance impact of the service modification events according to an ordering corresponding to the ranking, in operation 810.

Figure 9:
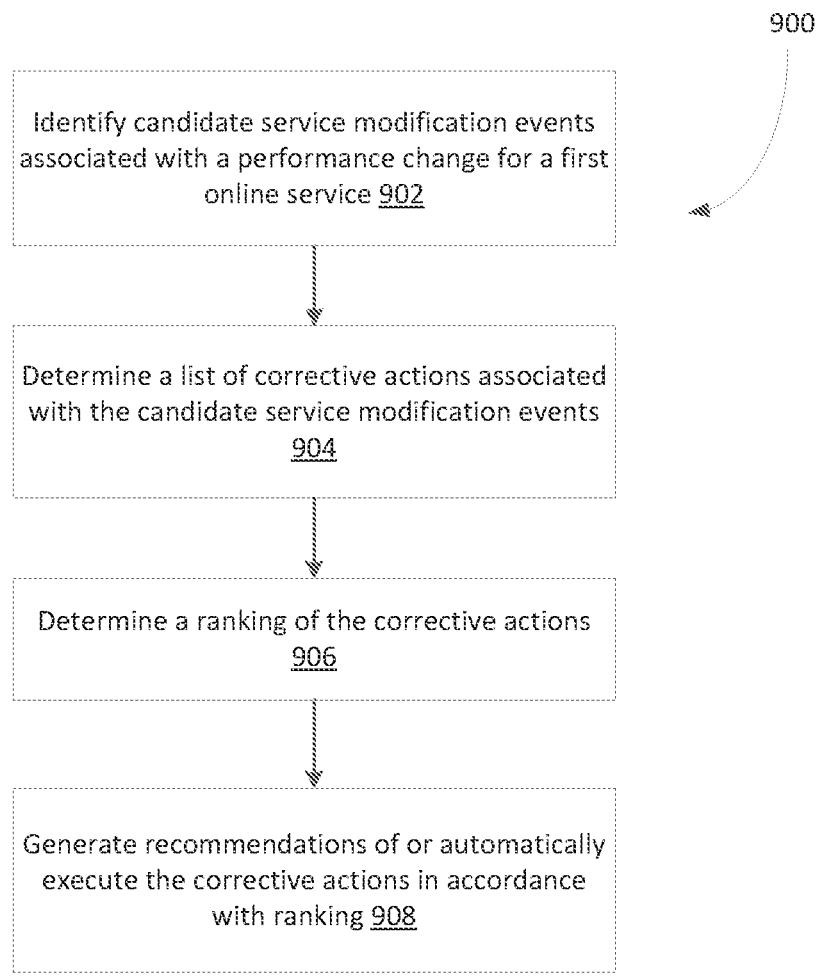
FIG. 9 shows, in flowchart form, an example method for performing corrective actions for optimizing performance of an online service.

Reference is now made to FIG. 9 which shows, in flowchart form, an example method 900 for performing corrective actions for optimizing performance of an online service. The operations of method 900 may be performed subsequent, or in response, to identifying at least one service modification event as being a possible or likely cause of a performance change for the online service.

In operation 902, the server identifies candidate service modification events associated with an unanticipated performance change for a first online service. The candidate service modification events are those events which are determined by the server to be possible or likely causes of a detected performance change for the first online service.

In operation 904, the server determines a list of corrective actions associated with the candidate service modification events. The corrective actions may include, for example, uninstalling a plug-in or reverting to a previous version of a current theme associated with the first online service. More generally, the corrective actions may be actions that are intended to undo the candidate service modification events.

In operation 906, the server determines a ranking of the corrective actions. In some embodiments, the corrective actions may be ranked according to likelihood of impact on the performance of the first online service. For example, a corrective action that results in completely undoing the effects of a service modification event (e.g., uninstall of a recently installed plug-in) may be ranked higher than another corrective action resulting in a partial undoing (e.g., disabling select features of the recently installed plug-in) of such effects.

In operation 908, the server generates recommendations of or automatically executes the corrective actions in accordance with the ranking. The server may, for example, generate indications of recommended corrective actions for the first online service and transmit a message including the indication to a computing system (e.g., a client or merchant device) associated with the first online service. In some embodiments, the server may automatically execute the corrective actions sequentially in accordance with the ranking determined in operation 906. For example, the server may not prompt an operator of the first online service for selection or confirmation before proceeding to execute the corrective actions.

Example E-Commerce Platform

Although not required, in some embodiments, the methods disclosed herein may be performed on or in association with an e-commerce platform. An example of an e-commerce platform will now be described.

Figure 2:
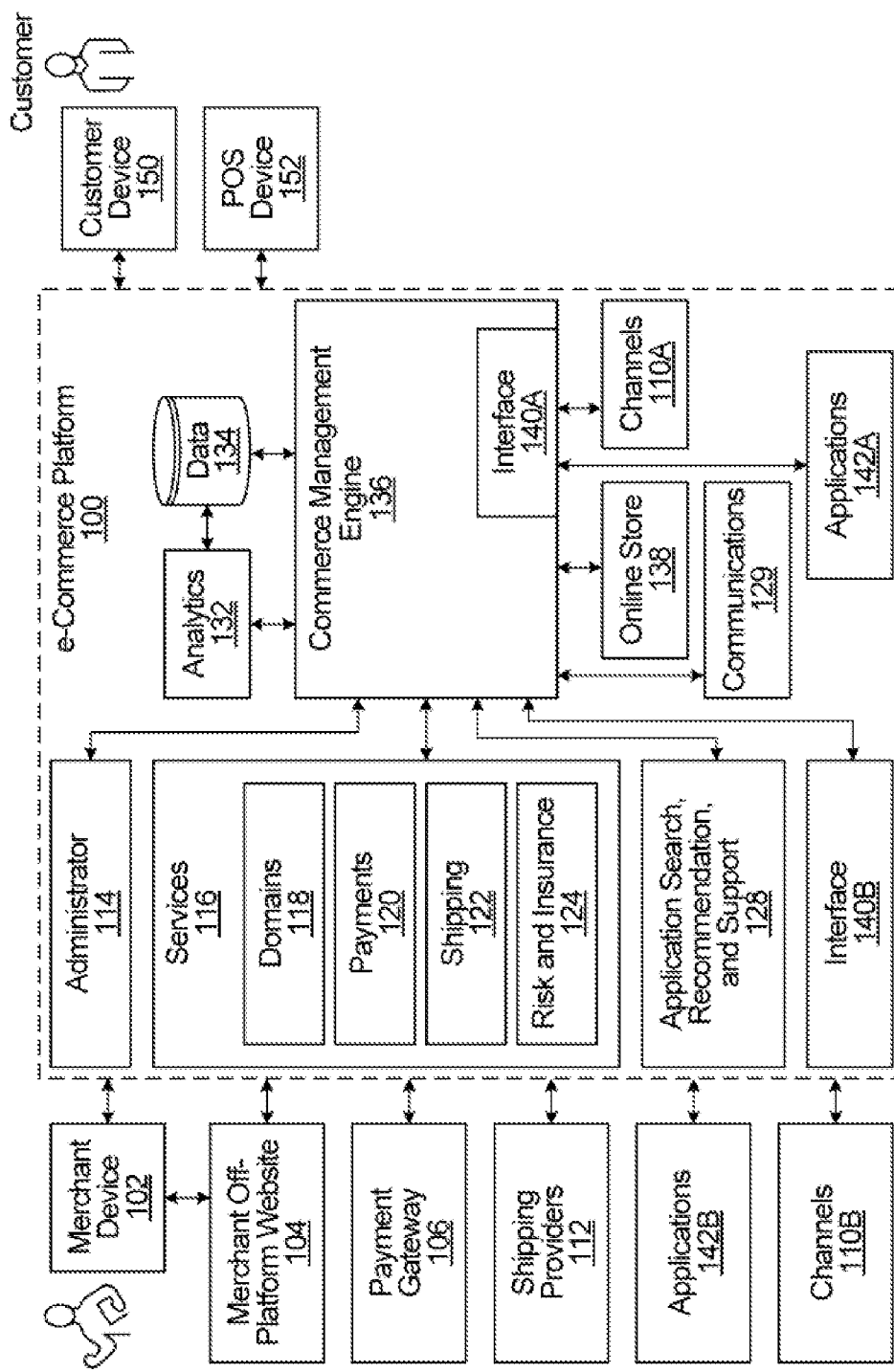
FIG. 2 is a block diagram of an e-commerce platform, in accordance with an example embodiment.

FIG. 2 illustrates an e-commerce platform 100, according to one embodiment. The e-commerce platform 100 may be exemplary of the e-commerce platform described with reference to FIG. 1. The e-commerce platform 100 may be used to provide merchant products and services to customers. While the present disclosure contemplates using the apparatus, system, and process to purchase products and services, for simplicity the description herein will refer to products. All references to products throughout this disclosure should be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products, an enterprise user, a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed, in part or in whole, through a machine that executes computer software, modules, program codes, and/or instructions on one or more processors which may be part of or external to the e-commerce platform 100. Merchants may utilize the e-commerce platform 100 for managing commerce with customers, such as by implementing an e-commerce experience with customers through an online store 138, through channels 110A-B, through point-of-sale (POS) devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform), and the like. However, even such other merchant commerce facilities may be incorporated into the e-commerce platform, such as where POS devices 152 in a physical store of a merchant are linked to the e-commerce platform 100, where a merchant off-platform website 104 is tied to the e-commerce platform 100, such as through "buy buttons" that link content from the merchant off platform website 104 to the online store 138, and the like.

The online store 138 may represent a multitenant facility comprising a plurality of virtual storefronts. In some embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A-B may be provided internal to the e-commerce platform 100 or from outside the e-commerce platform 100. A merchant may sell in their physical retail store, at pop-ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communications facility 129 to leverage customer interactions and analytics 132 to improve the probability of sales. Throughout this disclosure, the terms "online store" and "storefront" may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via communications facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client, such as a thin client, via a web browser or other application, accessed through by POS devices, and the like). In some embodiments, elements of the e-commerce platform 100 may be implemented to operate on various platforms and operating systems, such as iOS™, Android™, on the web, and the like (e.g., the administrator 114 being implemented in multiple instances for a given online store for iOS™, Android™, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150, and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add products to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store 138 may implement a content management system for website content. Merchants may author blog posts or static pages and publish them to their online store 138, such as through blogs, articles, and the like, as well as configure navigation menus. Merchants may upload images (e.g., for products), videos, content, data, and the like to the e-commerce platform 100, such as for storage by the system (e.g., as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services (identified as services 116 in FIG. 2), an administrator 114, and the like associated with running an on-line business, such as providing a domain service 118 associated with their online store, payments facility 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 3:
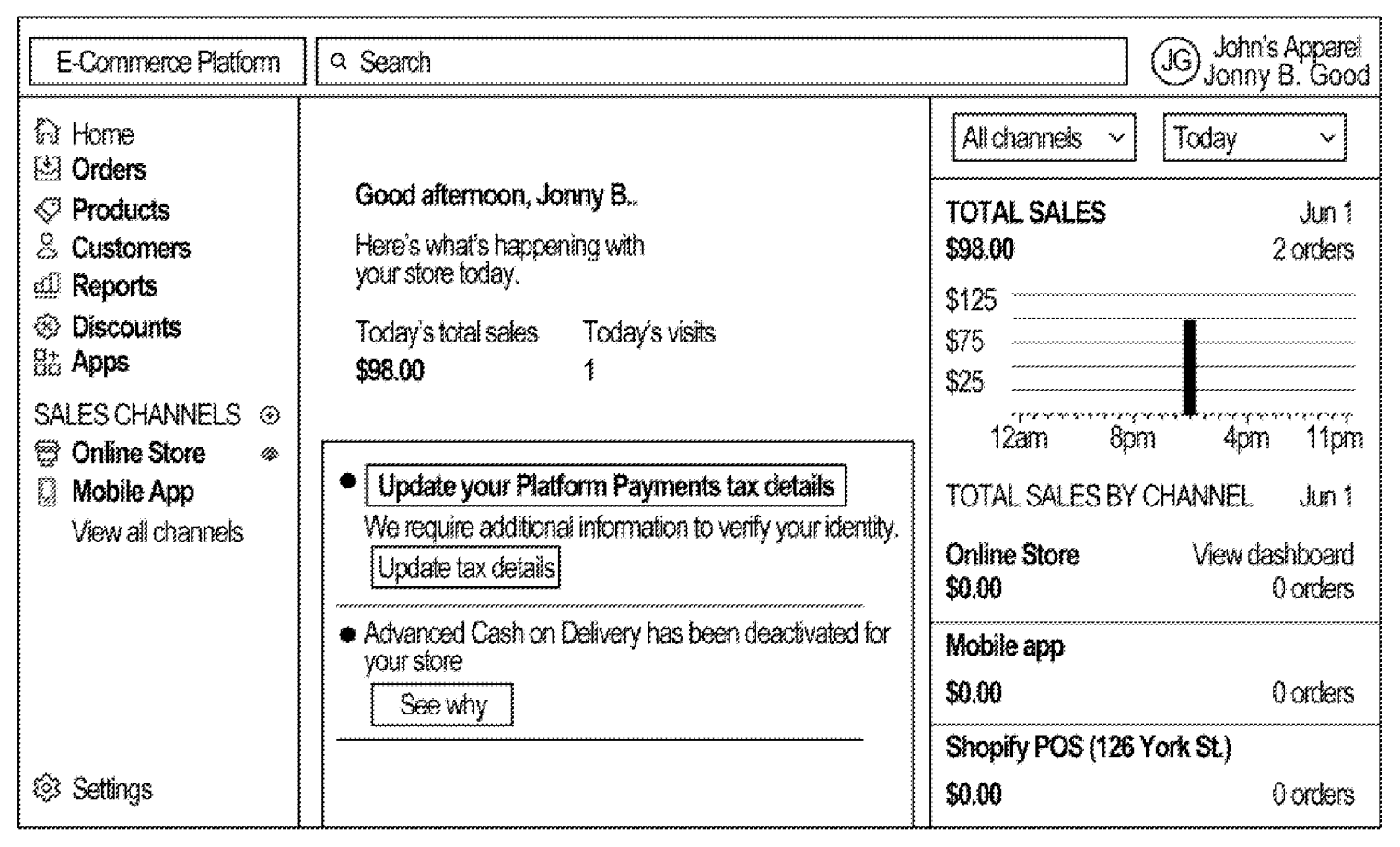

FIG. 3 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's recent activity, updating the online store's catalog, managing orders, recent visits activity, total orders activity, and the like. In some embodiments, the merchant may be able to access the different sections of administrator 114 by using the sidebar, such as shown on FIG. 3. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store, POS devices, and/or a buy button. The administrator 114 may also include interfaces for managing applications installed on the merchant's account, and settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's recent activity, updating the online store's catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide payments facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The payments facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They may also connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 2, in some embodiments the e-commerce platform 100 may be configured with a commerce management engine 136 for content management, task automation, and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services. The applications 142A may be provided internal to the e-commerce platform 100 or applications 142B may be provided from outside the e-commerce platform 100. In some embodiments, an application 142A may be provided by the same party providing the e-commerce platform 100 or by a different party. In some embodiments, an application 142B may be provided by the same party providing the e-commerce platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion in the commerce management engine 136 may need to exceed a core functionality threshold through which it may be determined that the function is core to a commerce experience (e.g., common to a majority of online store activities, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through interface(s) 140A-B, such as by extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the e-commerce platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the e-commerce platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payments facility 120, which is another example of a component that utilizes data from the commerce management engine 136 but may be located outside so as to not violate the isolation principle. The platform payments facility 120 may allow customers interacting with online stores 138 to have their payment information stored safely by the commerce management engine 136 such that they only have to enter it once. When a customer visits a different online store 138, even if they have never been there before, the platform payments facility 120 may recall their information to enable a rapid and accurate checkout. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. Thus, the platform payment facility may be implemented external to the commerce management engine 136.

For those functions that are not included within the commerce management engine 136, applications 142A-B provide a way to add features to the e-commerce platform 100.

Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interfaces 140A-B, such as where an application 142A-B is able to surface transaction data to a merchant (e.g., app: "engine, surface my app data in mobile and web admin using the embedded app SDK"), and/or where the commerce management engine 136 is able to ask the application to perform work on demand (e.g., engine: "app, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as by utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extensions/APIs 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over or be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, for synchronizing a local database, notifying an external integration partner, and the like. Update events may enable this functionality without having to constantly poll the commerce management engine 136 to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator 114, or automatically (e.g., via the APIs 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128 functionalities. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized for application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, and integration applications. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)), and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping rates based on the customer's shipping address. Checkout may delegate the calculation of taxes to a tax component and the calculation of shipping rates to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping rate is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency, or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like.

At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts, to avoid over-selling (e.g., merchants may control this behavior from the inventory policy of each variant). Inventory reservation may have a short time span (e.g., minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order, or incoming from an inventory transfer component (e.g., from a vendor).

The merchant may then review and fulfill (or cancel) the order. A review component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. Conditions may be imposed on returns, such as requiring that they be initiated within a set period (e.g., 30 days) of the original order date. The business process merchants may go through to "un-sell" an item may be implemented by a return component. Returns may consist of a variety of different actions, such as: a re-stock, where the product that was sold actually comes back into the business and is sellable again; a refund, where the money that was collected from the customer is partially or fully returned; an accounting adjustment noting how much money was refunded (e.g., including if there was any re-stocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
    obtaining, by a server, a value for at least one performance metric associated with a web page of a first online service based on tracking user interactions for loading the web page and rendering of content on the web page;
    detecting a service modification event for the first online service;
    identifying, by the server, a second online service that satisfies a service similarity criterion relative to the first online service;
    obtaining historical service modification events data for the second online service;
    comparing changes in the value for the at least one performance metric resulting from the service modification event for the first online service to changes in performance metric values resulting from the historical service modification events for the second online service;
    determining that the service modification event is associated with an unanticipated performance change for the first online service based on the comparing;
    providing an indication identifying the service modification event as being associated with the unanticipated performance change for the first online service; and
    executing corrective actions to disable one or more features of the first online service for undoing the service modification event.

2. The method of claim 1, wherein executing the one or more corrective actions comprises at least one of:
    uninstalling a plugin for the first online service; or
    reverting to a previous theme associated with the first online service.

3. The method of claim 1, wherein the one or more corrective actions are ranked according to impact on undoing effects of the service modification event for the first online service and wherein the one or more corrective actions are sequentially executed based on their respective ranks.

4. The method of claim 1, wherein the service modification event comprises one of:
    installation of a plugin for the first online service;
    updating to a new version of a plugin that is installed for the first online service;
    changing a current theme associated with the first online service; or
    modifying source code for a current theme.

5. The method of claim 1, wherein identifying the second online service comprises:
    computing a similarity score for the second online service, the similarity score indicating similarity of the second online service to the first online service; and
    determining that the similarity score for the second online service exceeds a defined threshold.

6. The method of claim 5, wherein the similarity score for the second online service is computed based on comparing service data associated with the first and second online services.

7. The method of claim 1, further comprising:
    identifying one or more third online services that are different from the second online service;
    obtaining historical service modification events data for the one or more third online services; and
    comparing changes in the value for the at least one performance metric resulting from the service modification event for the first online service to changes in performance metric values resulting from historical service modification events for the one or more third online services,
    wherein the service modification event is determined to be associated with the unanticipated performance change for the first online service based on comparisons using data for the second online service and the one or more third online services.

8. The method of claim 1, wherein determining that the service modification event is associated with the unanticipated performance change for the first online service comprises determining that a difference between an amount of change in the value for the at least one performance metric resulting from the service modification event for the first online service and an amount of change in value for the same at least one performance metric resulting from the service modification event for the second online service exceeds a defined threshold.

9. The method of claim 1, wherein determining that the service modification event is associated with the unanticipated performance change for the first online service comprises determining that an amount of change in the value for the at least one performance metric exceeds a defined threshold.

10. The method of claim 1, wherein determining that the service modification event is associated with the unanticipated performance change for the first online service comprises determining that the service modification event occurred for the first online service either within a defined time window prior to detecting the performance change or since a last measurement of the value for the at least one performance metric.

11. The method of claim 1, further comprising:
    determining one or more recommended corrective actions for the first online service, wherein providing the indication comprises communicating the one or more recommended corrective actions to a computing system associated with the first online service.

12. The method of claim 1, further comprising:
    detecting at least one additional service modification event for the first online service; and
    determining a ranking of the service modification events for the first online service based on information identifying modification events that were previously flagged or known to cause performance changes,
    wherein comparison of changes in performance metric values resulting from the service modification events for the first online service is performed according to an order based on the ranking of the service modification events.

13. The method of claim 7, wherein identifying the second online service comprises identifying a service that is similar to the first online service based on a first similarity criterion and wherein identifying the one or more third online services comprises identifying services that are similar to the first online service based on criteria different from the first similarity criterion.

14. The method of claim 11, further comprising:
    identifying, based on the comparing, at least one service setting for the first online service that, in combination with the service modification event, is associated with the unanticipated performance change for the first online service, wherein the indication identifies the service modification event and the at least one service setting as being associated with the unanticipated performance change for the first online service.

15. A computing system, comprising:

a processor;

a memory storing computer-executable instructions that, when executed by the processor, are to cause the processor to:
  obtain a value for at least one performance metric associated with a web page of a first online service based on tracking user interactions for loading the web page and rendering of content on the web page;
  detect a service modification event for the first online service;
  identify a second online service that satisfies a service similarity criterion relative to the first online service;
  obtain historical service modification events data for the second online service;
  compare changes in the value for the at least one performance metric resulting from the service modification event for the first online service to changes in performance metric values resulting from historical service modification events for the second online service;
  determine that the service modification event is associated with an unanticipated performance change for the first online service based on the comparing;
  provide an indication identifying the service modification event as being associated with the unanticipated performance change for the first online service; and
  execute corrective actions to disable one or more features of the first online service for undoing the service modification event.

16. The computing system claimed in claim 15, wherein the service modification event comprises one of:
  installation of a plugin for the first online service;
  updating to a new version of a plugin that is installed for the first online service;
  changing a current theme associated with the first online service; or
  modifying source code for a current theme.

17. The computing system claimed in claim 15, wherein identifying the second online service comprises:
  computing a similarity score for the second online service, the similarity score indicating similarity of the second online service to the first online service; and
  determining that the similarity score for the second online service exceeds a defined threshold.

18. The computing system claimed in claim 15, wherein the instructions, when executed by the processor, are to cause the processor to:
  identify one or more third online services that are different from the second online service;
  obtain historical service modification events data for the one or more third online services; and
  compare changes in the value for the at least one performance metric resulting from the service modification event for the first online service to changes in performance metric values resulting from historical service modification events for the one or more third online services,
  wherein the service modification event is determined to be associated with the unanticipated performance change for the first online service based on comparisons using data for the second online service and the one or more third online services.

19. The computing system claimed in claim 17, wherein the similarity score for the second online service is computed based on comparing service data associated with the first and second online services.

20. A non-transitory, computer-readable medium storing computer-executable instructions that, when executed by a processor, are to cause the processor to:
  obtain a value for at least one performance metric associated with a web page of a first online service based on tracking user interactions for loading the web page and rendering of content on the web page;
  detect a service modification event for the first online service;
  identify a second online service that satisfies a service similarity criterion relative to the first online service;
  obtain historical service modification events data for the second online service;
  compare changes in the value for the at least one performance metric resulting from the service modification event for the first online service to changes in performance metric values resulting from historical service modification events for the second online service;
  determine that the service modification event is associated with an unanticipated performance change for the first online service based on the comparing;
  provide an indication identifying the service modification event as being associated with the unanticipated performance change for the first online service; and
  execute corrective actions to disable one or more features of the first online service for undoing the service modification event.

* * * * *